United States Patent [19]
Parham, Jr. et al.

[11] 3,798,020
[45] Mar. 19, 1974

[54] PROCESS FOR INCORPORATING MICRONUTRIENTS IN LIQUID PHOSPHATIC FERTILIZERS

[75] Inventors: Thomas Moylan Parham, Jr., Colonial Heights; James Earl Sansing, Jr., Chester, both of Va.

[73] Assignee: Allied Chemical Corporation, New York, N.Y.

[22] Filed: June 17, 1971

[21] Appl. No.: 154,170

[52] U.S. Cl. .......................... 71/1, 71/64 C
[51] Int. Cl. .............................. C05d 9/02
[58] Field of Search ............. 71/1, DIG.2, 64 C

[56] References Cited
UNITED STATES PATENTS

| | | |
|---|---|---|
| 3,244,500 | 5/1966 | Stinson ........................... 71/1 |
| 3,131,048 | 4/1964 | Bulassa .......................... 71/1 |
| 2,534,787 | 12/1950 | Mecca ....................... 71/DIG. 2 |
| 2,859,104 | 11/1958 | Kroll ......................... 71/DIG. 2 |
| 3,558,300 | 1/1971 | Wagner ........................... 71/1 |
| 3,290,140 | 12/1966 | Yang ........................... 71/64 C |

OTHER PUBLICATIONS

Chemicals Used in Food Processing, National Academy of Sciences, 1965, pp. 15–17

*Primary Examiner*—Charles N. Hart
*Assistant Examiner*—Richard Barnes
*Attorney, Agent, or Firm*—Patrick L. Henry; Fred L. Kelly

[57] ABSTRACT

The sequestration of micronutrient metal ions in liquid phosphatic fertilizer solutions is facilitated by incorporating in the solutions a synergistic combination of citrate and polyphosphate salts.

10 Claims, No Drawings

PROCESS FOR INCORPORATING MICRONUTRIENTS IN LIQUID PHOSPHATIC FERTILIZERS

BACKGROUND OF THE INVENTION

This invention relates to sequestering or inhibiting the precipitation of micronutrient metal ions in aqueous phosphatic fertilizer solutions.

The use of micronutrients in fertilizers is experiencing increased use. These elements such as zinc, manganese, boron, copper, molybdenum and iron are fully as important as the primary nutrients, nitrogen, phosphorus, and potassium, although the former are used in much smaller quantities. Agronomic tests in a large number of states have been concerned with establishing where the need for micronutrients exists, comparing sources and carriers, and indicating amounts that may be needed.

The research and development work in preparation of fertilizers enriched with micronutrients has been concerned with evaluating various materials for supplying micronutrients in fertilizer formulations, comparing various carrier fertilizers for the micronutrients, and development of suitable techniques for adding micronutrients to the fertilizers.

Fluid fertilizers offer a good situation for inclusion of micronutrients because of the generally custom-type methods of preparation. The main problem in the addition of micronutrients to liquid mixed fertilizers is solubility. Boron as sodium borate and molybdenum as sodium molybdate are sufficiently soluble for practical purposes in both orthophosphate and polyphosphate solutions. Compounds of zinc, copper, iron, and manganese are almost insoluble in ammonium orthophosphate solution such as 8-24-0 and in mixed liquid fertilizer made from it. When a solution of zinc sulfate is added to 8-24-0 orthophosphate solution, the zinc is precipitated as zinc ammonium phosphate. Similar precipitates are formed when salts of manganese, iron, and copper are added. The various chelates have allowed reasonably adequate levels of several of the micronutrients, but these materials are comparatively expensive.

The polyphosphates in superphosphoric acid are beneficial for increasing solubility of most of the micronutrients in its ammoniated solutions. Polyphosphate solutions such as 10-34-0 sequester most micronutrient elements, thus dissolving and holding in solution substantial concentrations of them. The amount depends on the polyphosphate content of the solution and on the micronutrient material.

U.S. Pat. No. 3,558,300, assigned to Allied Chemical Corporation, relates to foliar application of ammonium polyphosphate fertilizer solutions to field crops to improve the growth rate, stress resistance, and maximum planting density of such crops. This patent discloses that micronutrients such as copper, zinc, molybdenum, and iron may be incorporated in the ammonium polyphosphate solutions in the form of their sulfate salts.

While such development work has contributed to the art, research in this field has continued in an effort to discover methods of increasing the amounts of micronutrients that can be sequestered in liquid phosphatic fertilizers to levels that more nearly meet plant requirements. Typically, up to 25–50 pounds of zinc, iron, copper or manganese per acre is recommended over much of the United States.

SUMMARY OF THE INVENTION

An object of this invention is to provide a process for sequestering and inhibiting the precipitation of micronutrient metal ions in aqueous phosphatic fertilizer solutions.

Another object of this invention is to provide a liquid phosphatic fertilizer containing a sequestering agent which is effective in sequestering and inhibiting the precipitation of micronutrient metal ions in said liquid phosphatic fertilizer.

A still further object of this invention is to provide a sequestering agent which is effective in sequestering and inhibiting the precipitation of micronutrient metal ions selected from the group consisting of zinc, iron, copper and manganese ions in mixed liquid fertilizers containing ammonium orthophosphate.

Other objects will become apparent from a reading of the following detailed description.

The present invention is based on the discovery of a synergistic effect in the sequestration of certain micronutrient metal ions in liquid phosphatic fertilizers, said synergism resulting from a combination of said ions with water-soluble salts of citric acid and polyphosphoric acids.

More definitely stated, the present invention is directed to a process for sequestering and inhibiting precipitation of a micronutrient metal cation selected from the group consisting of zinc, iron, copper and manganese in an aqueous phosphatic fertilizer solution, which comprises incorporating therein a synergistic combination of said micronutrient metal cation, a water-soluble polyphosphate and a water-soluble citric acid salt, the proportion of said polyphosphate to said citric acid salt being about 0.5 to ten parts by weight of polyphosphate, measured as $P_2O_5$, to one part by weight of citric acid salt, measured as citric acid. The water-soluble polyphosphate salt is normally incorporated in the form of an aqueous ammonium polyphosphate solution derived from superphosphoric acid.

The amount of sequestering agent necessary to be effective varies with the type and amount of micronutrient metal ions, pH conditions, temperature and the like. Generally, about 0.5 to 1.5 mol of citric acid salt is adequate per mol of trace nutrient metal, provided that polyphosphate is present in the amounts stated hereinabove.

Citric acid and its salts are commerically available. For purposes of the present invention, sodium, potassium and ammonium citrates are particularly suitable.

The aqueous ammonium polyphosphate solution of the present invention can be obtained by evaporating aqueous wet-process phosphoric acid so as to form wet-process superphosphoric acid which is then diluted with water and partially ammoniated to a pH of about 5 to 8. A suitable ammonium polyphosphate solution which is commerically available has a pH of from about 5 to 8, preferably about 6; a nitrogen content of from about 9 to 12 percent by weight, preferably from about 10 to 11 percent by weight; a total phosphorus content measured as $P_2O_5$ of from about 28 to 39 percent by weight, preferably about 34 to 38 percent by weight, and wherein polymeric phosphates represent from about 40 to 80 percent by weight, preferably from about 55 to 70 percent by weight, based on the weight of the total phosphorus content. The polymeric phosphates include pyrophosphates and higher polyphosphates.

An aqueous ammonium polyphosphate solution having the following properties, which will hereinafter be referred to as "Solution A," was found to be useful for purposes of the present invention:

Nitrogen — 10 percent by weight
Phosphorus[1] (as $P_2O_5$) — 34 percent by weight
Trace Minerals — 1 to 2 percent by weight
  iron ($Fe_2O_3$) — ca. 0.7 percent by weight
  calcium (CaO) — ca. 0.1 percent by weight
  magnesium (MgO) — ca. 0.3 percent by weight
pH — 6.0
Specific Gravity at 60°F. 1.4
Salting Out Temperature 0°F.

[1]Distribution as percent by weight of the ammonium phosphates present was about:

37 percent ammonium orthophosphate
49 percent ammonium pyrophosphate
8 percent ammonium tripolyphosphate
5 percent ammonium tetrapolyphate
1 percent higher ammonium phosphates

DESCRIPTION OF THE PREFERRED EMBODIMENT

In order to demonstrate the invention, the following examples are given:

EXAMPLE 1

A conventional process comprises preparing in a batch mixer a stock fertilizer solution made from ammonia, orthophosphoric acid and water in amounts sufficient to provide 8 percent nitrogen and 24 percent phosphorus expressed as $P_2O_5$, based on the total weight of the solution. Saturated solutions of trace nutrient metal salts (chlorides, sulfates or nitrates may be used) are added separately to portions of the stock solution until precipitation occurs. It is found that only the following relatively small amounts of trace nutrients can be dissolved (percents are based on the total weight of the formulation):

zinc — 0.05 percent expressed as metal
iron — 0.08 percent expressed as metal
copper — 0.10 percent expressed as metal
manganese — 0.02 percent expressed as metal To the above stock solution is added 10 percent, based on the total weight, of citric acid as sodium citrate. Then, the amounts of trace nutrients that can be dissolved are measured again; results are as follows:

zinc — 0.25 percent expressed as metal
iron — 3.00 percent expressed as metal
copper — 1.50 percent expressed as metal
manganese — 0.10 percent expressed as metal

EXAMPLE 2

A stock ammonium phosphate fertilizer solution is prepared as in Example 1 except that in place of orthophosphoric acid, superphosphoric acid is used containing about 60 percent of the $P_2O_5$ content as polyphosphoric acids, the remainder being orthophosphoric acid. As in Example 1, saturated solutions of trace nutrient metal salts are added separately to portions of said stock solution containing ortho- and polyphosphates until precipitation occurs. The following amounts of trace nutrients are added:

zinc — 2.50 percent expressed as metal
iron — 1.00 percent expressed as metal
copper — 1.50 percent expressed as metal
manganese — 0.25 percent expressed as metal To the above stock solution containing ortho- and polyphosphates is added 10 percent by weight citric acid as sodium citrate, based on the total weight of the formulation. The amounts of trace nutrients that can be dissolved without precipitation are as follows:

zinc — 6.00 percent expressed as metal
iron — 5.50 percent expressed as metal
copper — 5.00 percent expressed as metal
manganese — 0.50 percent expressed as metal Comparison of the data in Example 1 and Example 2 shows that the total effect of polyphosphates plus citric acid on solubility of the metals is greater than the sum of the two effects taken independently, i.e., synergism is demonstrated. Similar results are noted in various other phosphatic fertilizer solutions.

EXAMPLE 3

This comparative example demonstrates preparation of 5-15-5 liquid fertilizer solutions containing trace nutrient metals.

A stock fertilizer solution is first prepared using conventional procedures involving mixing a commerical ammonium nitrate-urea solution containing about 45.1 percent by weight ammonium nitrate, 34.8 percent by weight urea and 20.1 percent by weight water, with Solution A (described hereinabove), potassium chloride and water to give a solution containing 5 percent nitrogen, 15 percent $P_2O_5$ and 5 percent $K_2O$, by weight. About 63 percent of the phosphate in this solution is in the form of polyphosphates, the remainder being orthophosphate. It is found that no more than 1.0 percent of zinc or no more than 0.7 percent of iron (as chlorides, sulfates or nitrates) can be added to this stock fertilizer solution without formation of a precipitate.

A second stock fertilizer solution is prepared in the same manner except that part of the water is replaced with sodium citrate equivalent to about 11 percent citric acid, based on the total weight of the solution. It is found that trace nutrient salts equivalent to 4 percent zinc or 4 percent iron, based on the total weight, can be added to the 5-15-5 solution without formation of a precipitate. Similar results are obtained when potassium or ammonium citrate are substituted in place of sodium citrate.

Further tests show that in a similar 5-15-5 liquid fertilizer solution with 6 percent citric acid content, about 3 percent zinc or 3 percent iron, based on the total weight, can be added without formation of a precipitate; correspondingly, with 3 percent citric acid present, about 2.0 percent zinc or 2.5 percent iron can be added without precipitation of solids.

EXAMPLE 4

The following comparative example demonstrates addition of more than one trace nutrient metal to complete liquid fertilizer solutions.

Two 5-15-5 stock fertilizer solutions are prepared as described in Example 3 containing zero and 6 percent by weight citric acid in the form of sodium citrate. With no citrate present, 0.8 percent by weight of zinc plus 0.3 percent by weight of iron, or 0.4 percent zinc plus 0.5 percent iron are typical of the amounts of trace nutrients that can be added without precipitation of solids. With 6 percent citric acid in the 5-15-5 stock fertilizer solution, combinations such as 2 percent by weight zinc plus 1 percent by weight iron or 1 percent by weight zinc plus 2 percent by weight iron can be made without precipitation of solids.

EXAMPLE 5

This example shows three typical liquid fertilizer formulations based on one ton of liquid fertilizer of grade 5-15-5 (after addition of citrate and trace nutrient salt). Solution A used in these formulations has been described in detail hereinabove; it is a 10-34-0-0.5 Fe solution containing about 63 percent of the phosphate as polyphosphate. For convenience, the ammonium nitrate-urea solution utilized in the formulations is called "Solution B;" Solution B contains about 45.1 percent by weight ammonium nitrate, 34.8 percent by weight urea and 20.1 percent by weight water. Potassium chloride is added as a commerical salt containing about 62% $K_2O$ equivalent. The primary fertilizer nutrients and water can be added in any convenient order of addition and mixed until completely solubilized. However, in order to avoid precipitation of trace nutrient compounds, the citrate is next added and completely dissolved, and the trace nutrient salt is then added with agitation, either as a solid or as an aqueous solution. Preferably, a trace nutrient solution is added at a point where agitation is maximum, e.g., at the vortex of a stirrer. In these formulations, the citrate source is a 30 percent by weight aqueous solution of sodium citrate. The trace nutrient sources are:

zinc — $ZnCl_2$, aqueous solution, 28% Zn
iron — $FeCl_3$, aqueous solution, 11.85% Fe
copper — $CuCl_2$ aqueous solution, 16.9% Cu

FORMULATION

Formulation for one ton of liquid 5-15-5 fertilizer containing 2 weight percent zinc:

| | Pounds |
|---|---|
| Solution B | 38 |
| Solution A | 882 |
| KCl | 162 |
| Water | 508 |
| 30% sodium citrate solution | 267 |
| 28% zinc solution | 143 |
| | 2,000 |

FORMULATION

Formulation for one ton of liquid 5-15-5 fertilizer containing 2 weight percent iron:

| | Pounds |
|---|---|
| Solution B | 38 |
| Solution A | 882 |
| KCl | 162 |
| Water | 347 |
| 30% sodium citrate solution | 267 |
| 11.85% Fe solution | 304 |
| | 2,000 |

This formulation takes into account the 0.5% Fe content of Solution A.

FORMULATION

Formulation for one ton of liquid 5-15-5 fertilizer containing 1 weight percent copper:

| | Pounds |
|---|---|
| Solution B | 38 |
| Solution A | 882 |
| KCl | 162 |
| Water | 667 |
| 30% sodium citrate solution | 133 |
| 16.9% copper solution | 118 |
| | 2,000 |

EXAMPLE 6

This example demonstrates preparation of metal chelate solutions suitable for incorporation in phosphatic fertilizer solutions containing polyphosphates in accordance with the present invention. Typically, the metal chelate solution contains a trace nutrient metal in aqueous solution, together with citric acid, the solution being adjusted to a pH near neutral, e.g., by addition of ammonia or caustic. Preferably, the citric acid to metal mol ratio is about 1. Such solutions are permanently stable. The following formulations typify such solutions:

FORMULATION

Formulation for citric acid chelated zinc (8% Zn at about pH 6.5):

| | Pounds |
|---|---|
| $ZnCl_2$ | 17 |
| Citric acid, anhydrous | 23 |
| Ammonia, anhydrous | 8 |
| Water | 52 |
| | 100 |

Order of addition is based on handling ease only. Typically, the citric acid is dissolved in water, ammonia is then added, followed by the $ZnCl_2$. The mixing vessel should have agitation and preferably should be closed to prevent loss of ammonia vapor. A cooling means for removing heat of neutralization is desirable.

FORMULATION

Formulation for citric acid chelated copper (8% Cu at about pH 6.5):

| | Pounds |
|---|---|
| $CuCl_2$ | 17 |
| Citric acid, anhydrous | 24 |
| Ammonia, anhydrous | 8 |
| Water | 51 |
| | 100 |

Mixing procedure is same as for Formulation for citric acid chelated zinc.

FORMULATION

Formulation for citric acid chelated iron (7% Fe at about pH 1):

| | Pounds |
|---|---|
| $FeCl_3 \cdot 6H_2O$ | 34 |
| Diammonium citrate | 28 |
| Water | 38 |
| | 100 |

Mixing vessel can be the same as for the zinc chelate formulation but a closed system is not needed when diammonium citrate is used. For convenience, water is added to the mixing vessel first; order of addition of remainder is not important.

EXAMPLE 7

This example shows use of chelated metal solutions of Example 6 in formulating one ton batches of a 5-15-5 liquid fertilizer in accordance with the present invention. In the following formulations, the primary nutrients are furnished by Solution A, Solution B and KCl as described in Example 5. The primary nutrients and water may be added in any convenient order of addition and mixed until solubilized. The chelated metal solution is then added with thorough mixing. The following formulations are typical:

FORMULATION

Formulation for one ton of liquid 5-15-5 fertilizer containing 1 weight percent zinc:

|  | Pounds |
|---|---|
| Solution B | 38 |
| Solution A | 882 |
| KCl | 162 |
| Water | 668 |
| 8% zinc chelate solution of Example 6 | 250 |
|  | 2,000 |

FORMULATION

Formulation for one ton of liquid 5-15-5 fertilizer containing 1 weight percent iron:

|  | Pounds |
|---|---|
| Solution B | 38 |
| Solution A | 882 |
| KCl | 162 |
| Water | 689 |
| 7% iron chelate solution of Example 6 | 229 |
|  | 2,000 |

This formulation takes into account the 0.5 percent iron content of Solution A.

FORMULATION

Formulation for one ton of liquid 5-15-5 fertilizer containing 0.5 weight percent copper:

|  | Pounds |
|---|---|
| Solution B | 38 |
| Solution A | 882 |
| KCl | 162 |
| Water | 793 |
| 8% copper chelate solution of Example 6 | 125 |
|  | 2,000 |

FORMULATION

Formulation for one ton of liquid 5-15-5 fertilizer containing 0.4 weight percent zinc, 0.4 weight percent iron, and 0.2 weight percent copper:

|  | Pounds |
|---|---|
| Solution B | 38 |
| Solution A | 882 |
| KCl | 162 |
| Water | 711 |
| 8% zinc chelate solution of Example 6 | 100 |
| 7% iron chelate solution of Example 6 | 57 |
| 8% copper chelate solution of Example 6 | 50 |
|  | 2,000 |

This formulation takes into account the 0.5% Fe content of Solution A.

We claim:

1. A process for sequestering and inhibiting precipitation of a micronutrient metal cation selected from the group consisting of zinc, iron, copper and manganese, in a liquid phosphate fertilizer solution, which comprises incorporating in said solution a synergistic combination of said micronutrient metal cation, a water-soluble polyphosphate, and a watersoluble citric acid salt; the proportion of said polyphosphate to said citric acid salt being about 0.5 to 10 parts by weight of polyphosphate, measured as $P_2O_5$, to one part by weight of citric acid salt, measured as citric acid.

2. The process of claim 1 wherein the water-soluble polyphosphate is ammonium polyphosphate.

3. The process of claim 1 wherein the micronutrient metal cation is zinc.

4. The process of claim 1 wherein the micronutrient metal cation is iron.

5. The process of claim 1 wherein the micronutrient metal cation is copper.

6. The process of claim 1 wherein the micronutrient metal cation is manganese.

7. The process of claim 1 wherein the polyphosphate is ammonium polyphosphate derived from superphosphoric acid and is in the form of an aqueous solution containing orthophosphate and polymeric phosphates, said polymeric phosphates representing from about 40 to 80 percent of said phosphates, based on the total phosphorus content.

8. The process of claim 1 wherein the micronutrient metal cation and the citric acid salt are incorporated in the phosphatic fertilizer solution in the form of a citrate chelated micronutrient metal.

9. The process of claim 1 wherein the water-soluble citric acid salt is incorporated in the phosphatic fertilizer solution prior to incorporation of the micronutrient metal cation.

10. The process of claim 1 wherein about 0.5 to 1.5 mol of citric acid salt is incorporated in the phosphatic fertilizer solution per mol of micronutrient metal cation.

* * * * *